United States Patent
Gastl et al.

(10) Patent No.: US 11,485,253 B2
(45) Date of Patent: Nov. 1, 2022

(54) SEATING SYSTEM FOR A VEHICLE

(71) Applicant: LEAR CORPORATION, Southfield, MI (US)

(72) Inventors: Philipp Gastl, Oberding (DE); Eckhard Nock, Wolnzach (DE); Johannes Barzen, Pfaffenhofen (DE)

(73) Assignee: LEAR CORPORATION, Southfield, MI (US)

( * ) Notice: Subject to any disclaimer, the term of this patent is extended or adjusted under 35 U.S.C. 154(b) by 480 days.

(21) Appl. No.: 16/533,930

(22) Filed: Aug. 7, 2019

(65) Prior Publication Data
US 2020/0070687 A1 Mar. 5, 2020

(30) Foreign Application Priority Data
Aug. 28, 2018 (DE) .......................... 102018214517.2

(51) Int. Cl.
*B60N 2/005* (2006.01)
*B60N 2/90* (2018.01)

(52) U.S. Cl.
CPC ............. *B60N 2/005* (2013.01); *B60N 2/919* (2018.02)

(58) Field of Classification Search
CPC .... B60N 2/005; B60N 2/01508; B60N 2/919; B60N 2/08; B60N 2/4235; B60N 2/43; B60N 2/42709; B60N 2205/35; B60N 2/427; B60N 2/01583
USPC ............................................ 296/68.1, 65.03
See application file for complete search history.

(56) References Cited

U.S. PATENT DOCUMENTS

| | | | |
|---|---|---|---|
| 3,578,376 A * | 5/1971 | Hasegawa | B60N 2/07 296/68.1 |
| 5,263,763 A | 11/1993 | Billette | |
| 6,431,632 B1 * | 8/2002 | Kozikowski | B60N 2/01583 248/503.1 |
| 9,889,768 B2 * | 2/2018 | Lussan | B64D 11/0696 |
| 2004/0262973 A1 | 12/2004 | Reubeuze et al. | |

(Continued)

FOREIGN PATENT DOCUMENTS

| | | |
|---|---|---|
| CN | 101376348 A | 3/2009 |
| CN | 102729857 A | 10/2012 |
| DE | 19817143 A1 | 10/1999 |

(Continued)

OTHER PUBLICATIONS

Office Action in German Application No. 102018214517.2 dated Aug. 16, 2019.
CN App. No. 2019107626964 Office Action dated Sep. 18, 2021.

*Primary Examiner* — Jason S Morrow
*Assistant Examiner* — Wenwei Zhuo
(74) *Attorney, Agent, or Firm* — Brooks Kushman P.C.

(57) ABSTRACT

A seating system for a vehicle having a seat and a vehicle body includes a latch system having a seat portion configured for attachment to the seat and selectively engageable to and disengageable from the vehicle body. The seat portion may include a deformable portion configured to deform when the seat portion is engaged with the vehicle body and the seat is subjected to a force directed in a forward direction relative to the seat. The seat portion may also include a detachable portion having a plurality of elements configured such that at least one of the elements separates from at least one other of the elements when the seat portion is engaged with the vehicle body and the seat is subjected to the force.

20 Claims, 3 Drawing Sheets

(56) References Cited

U.S. PATENT DOCUMENTS

2016/0176321 A1* 6/2016 Patalak ............... B60N 2/015
  29/434

FOREIGN PATENT DOCUMENTS

| DE | 102004018042 B3 | 9/2005 |
| DE | 102009021830 A1 | 11/2010 |
| JP | 2018065535 A | 4/2018 |

* cited by examiner

SEATING SYSTEM FOR A VEHICLE

CROSS-REFERENCE TO RELATED APPLICATIONS

This application claims foreign priority benefits under 35 U.S.C. § 119(a)-(d) to DE 10 2018 214 517.2, filed Aug. 28, 2018, the disclosure of which is hereby incorporated by reference in its entirety.

TECHNICAL FIELD

The present disclosure relates to a seating system for a vehicle.

BACKGROUND

The last row of seats in a vehicle is often attached to a portion of the vehicle body through a latch that can be unhooked to allow the seat back to lay flat, or to otherwise provide access to a trunk or other storage area. In the event of a large force being applied to one or more of the seats in the last row, the latch can be subjected to very high forces. These forces may come from the exertion of a passenger on a seat belt, an impact to the seat back from packages or other material stored behind the seat, or both. If the seat is pulled away from the vehicle body in a forward direction, the latch, which may be positioned at an outboard edge of the seat, may be subjected to large forces: forces that are not only in the longitudinal direction—i.e., front-to-back—but also in the transverse direction—i.e., side-to-side.

Depending on the latch configuration, large forces in the transverse direction may cause the latch to become unhooked from the vehicle body, thereby allowing the seat to undesirably move forward. Different latch designs have been implemented to try to address this issue, including manufacturing the latches from heavier, stronger material, and changing their general orientation. Each of these attempts have their own undesirable limitations, such as added complexity, reduced functionality, and added weight and cost.

SUMMARY

Embodiments described herein may include a seating system for a vehicle having a seat and a vehicle body. The seating system may include a latch system having a seat portion configured for attachment to the seat and selectively engageable to and disengageable from the vehicle body. The seat portion may include a deformable portion and a detachable portion. The deformable portion may be configured to deform when the seat portion is engaged with the vehicle body and the seat is subjected to a force of at least a predetermined magnitude directed in a forward direction relative to the seat. The detachable portion may include a plurality of elements configured such that at least one of the elements separates from at least one other of the elements when the seat portion is engaged with the vehicle body and the seat is subjected to the force.

Embodiments described herein may include a seating system for a vehicle having a seat and a vehicle body. The seating system may include a latch system having a seat portion including a first portion configured for attachment to the seat and a second portion connected to the first portion and selectively engageable to and disengageable from the vehicle body. The seat portion may be deformable such that the first portion and the second portion separate relative to each other when the second portion is engaged with the vehicle body and the seat is subjected to a force of at least a predetermined magnitude directed in a forward direction relative to the seat.

Embodiments described herein may include a seating system for a vehicle having a seat and a vehicle body. The seating system may include a latch system having a seat portion configured for attachment to the seat and selectively engageable to and disengageable from the vehicle body. The seat portion may include a first portion and a second portion that are pivotably attached to each other at respective proximal ends. The first and second portions may also be detachably connected to each other at respective distal ends such that the first and second portions detach at the distal ends and pivot relative to each other at the proximal ends when the seat portion is engaged with the vehicle body and the seat is subjected to a force of at least a predetermined magnitude directed in a forward direction relative to the seat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
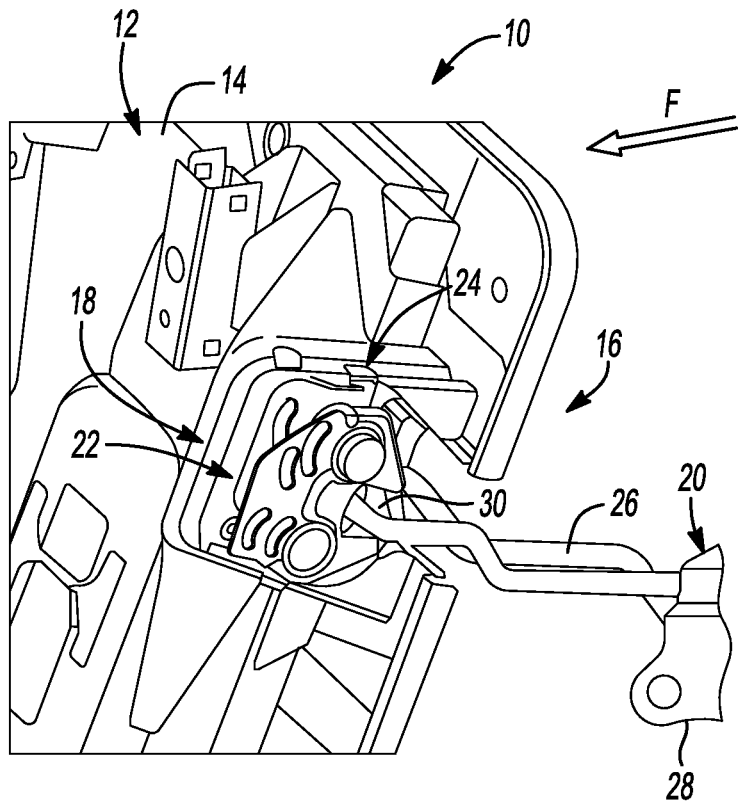
FIG. 1 shows a seating system for a vehicle in accordance with embodiments described herein.

FIG. 1 shows a seating system 10 for a vehicle in accordance with embodiments described herein. The vehicle includes a seat 12 of which a seat back 14 is shown. The seating system 10 includes a latch system 16 that has a seat portion 18 and a body portion 20. The seat portion 18 is configured for attachment to the seat 12, and in this embodiment, is configured for attachment to the seat back 14. The seat portion 18 includes a deformable portion 22 and a detachable portion 24, and the body portion includes a striker bar 26 that is configured for attachment to the vehicle body 28. The seat portion 18 is selectively engageable to and disengageable from the vehicle body 28 by a connection between a pawl 30, which is part of the seat portion 18, and the striker bar 26. As shown in FIG. 1, the pawl 30 is configured to receive the striker bar 26 to engage the seat portion 18 with the vehicle body 28.

When a seat, such as the seat 12, is subjected to a force of at least a predetermined magnitude directed in a forward direction relative to the seat—see the force (F) shown in FIG. 1—there may be a tendency for the latch system to disengage. This may be particularly true as the seat moves forward and a twisting motion is applied to the latch system. When the seat portion 18 is engaged with the vehicle body 28—e.g., through the pawl 30 and striker bar 26—and a force, such as the force (F), is applied to the seat 12, the deformable portion 22 is configured to deform and the detachable portion 24 is configured to separate. This helps to keep the seat portion 18 and the body portion 20 from disengaging from each other when the seat 12 is subjected to such a force.

Figure 2:
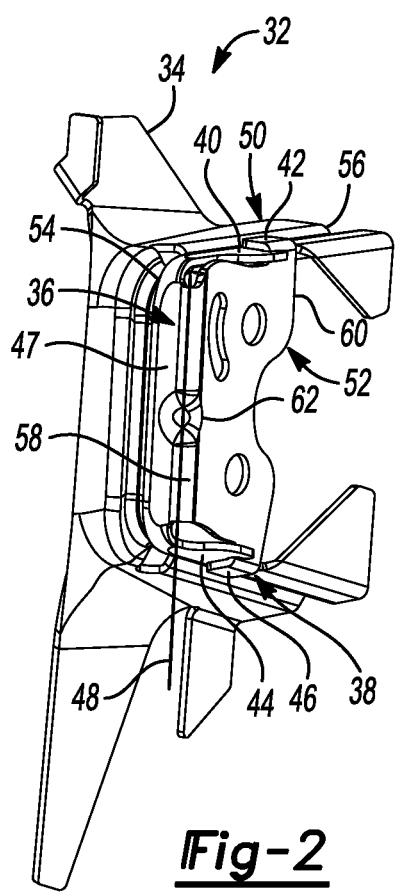
FIG. 2 shows a portion of a latch system configured for use with the seating system shown in FIG. 1.

FIG. 2 shows a portion of a latch system 32 configured similarly to the latch system 16 shown in FIG. 1. A seat portion 34 of the latch system 32 includes a deformable portion 36 and a detachable portion 38. The detachable portion 38 includes a plurality of elements 40, 42 near a top of the seat portion 34, and elements 44, 46 near a bottom of the seat portion 34, with the "top" and "bottom" being relative to the orientation shown in FIG. 2. The seat portion 34 is configured for attachment to the vehicle body—for example, through a pawl and striker bar arrangement such as shown in FIG. 1.

When the seat portion 34 is engaged with the vehicle body, and the seat to which it is attached is subjected to a force in the forward direction—such as the force (F) shown in FIG. 1—the deformable portion 36 is configured to deform and the detachable portion 38 is configured to detach. More particularly, elements 40, 42 and elements 44, 46 separate from each other and the deformable portion 36 forms a pivotable attachment 47 that remains intact, but pivots around an axis or pivot line 48. The seat portion 34 includes a first portion 50 with which the elements 40, 44 are integral; similarly, the seat portion 34 includes a second portion 52 with which the elements 42, 46 are integral. The first portion 50 includes a proximal end 54 and a distal end 56, and the second portion 52 includes a proximal end 58 and a distal end 60.

As shown in FIG. 2, the first and second portions 50, 52 are connected to each other at their respective proximal ends 54, 58 at the pivotable attachment 47. Similarly, the first and second portions 50, 52 are connected to each other at their respective distal ends 56, 60 by the elements 40, 42 and 44, 46. When a seat, such as the seat 10, is subjected to a force of at least a predetermined magnitude—for example, the force (F)—the elements 40, 44 separate from the elements 42, 46. Stated another way, in the presence of the force (F), the detachable portion 38 detaches, which allows the deformable portion 36 to deform as the first and second portions 50, 52 pivot relative to each other around the pivot line 48. This is illustrated more clearly in FIGS. 5 and 6.

As described above, the force (F) is at least as great as a predetermined magnitude, and when applied to a seat in a forward direction, it may cause the detachable portion 38 to detach and the deformable portion 36 to deform. The magnitude of the force necessary to cause detaching and deformation of a latch system—such as the latch system 32, or the latch system 16—can be controlled by the configuration of the seat portion of the latch system. With regard to the detachable portion, FIG. 2 shows the elements 40, 42 configured as semi-shear flanges; the elements 44, 46 are similarly configured. The bonding strength between the elements 40, 42 and the elements 44, 46 can be increased if it is desired to increase the minimum magnitude of force necessary to detach. Similarly, the elements 40-46 of the detachable portion 38 may be configured with a relatively weak bond between them, if it is desired to reduce the amount of force necessary to detach them from each other. The elements 40, 42—and similarly, the elements 44, 46—can be attached to each other by any means that is effective to provide the desired bonding strength—e.g., friction, fasteners, adhesive, etc.

Once the detachable portion 38 detaches, the amount of force necessary to pivot the first and second portions 50, 52 relative to each other can be controlled by the configuration of the deformable portion 36. Changing the thickness of the material or the material type can change the amount of force required to deform the deformable portion 36. Another way to change the force required for deformation is to include one or more discontinuities at or near the pivot line 48. As shown in FIG. 2, the pivotable attachment 47 includes a discontinuity 62, which in this embodiment is a swaged portion—i.e., an indentation applied, for example, by swaging. Having one or more indentations such as shown in FIG. 2 increases the strength of the pivotable attachment 47, thereby increasing the force necessary to cause the first and second portions 50, 52 to pivot relative to each other.

Figure 3:
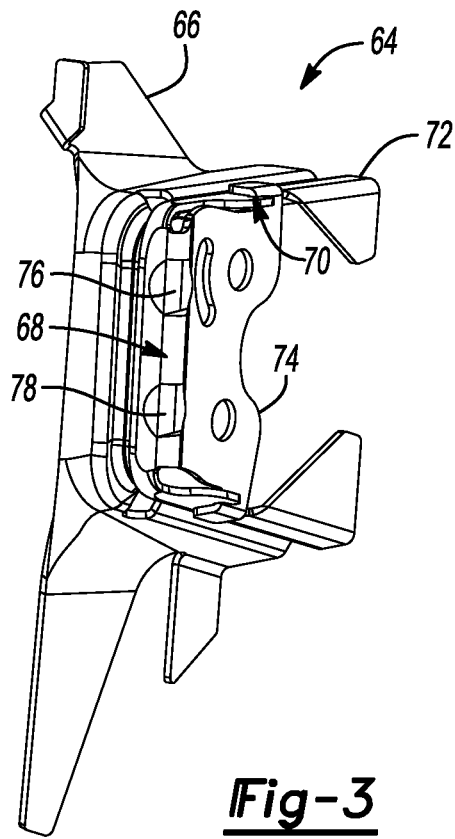
FIG. 3 shows a portion of a latch system configured for use with the seating system shown in FIG. 1.

FIG. 3 shows a portion of a latch system 64 configured similarly to the latch system 32 shown in FIG. 2. A seat portion 66 of the latch system 64 includes a deformable portion 68 and a detachable portion 70. Other elements of the seat portion 66 are similarly configured to corresponding elements of the seat portion 34 shown in FIG. 2. For example, the seat portion 66 includes first and second portions 72, 74, which pivot relative to each other at the deformable portion 68 when a force of at least a predetermined magnitude is applied to the seat. One difference between the seat portion 66 and the seat portion 34 shown in FIG. 2 is that the deformable portion 68 includes two discontinuities 76, 78, and the discontinuities 76, 78 are holes rather than swaged portions. Therefore, the discontinuities in the seat portion 66 reduce the amount of force necessary to pivot the first and second portions 72, 74 relative to each other.

Figure 4B:
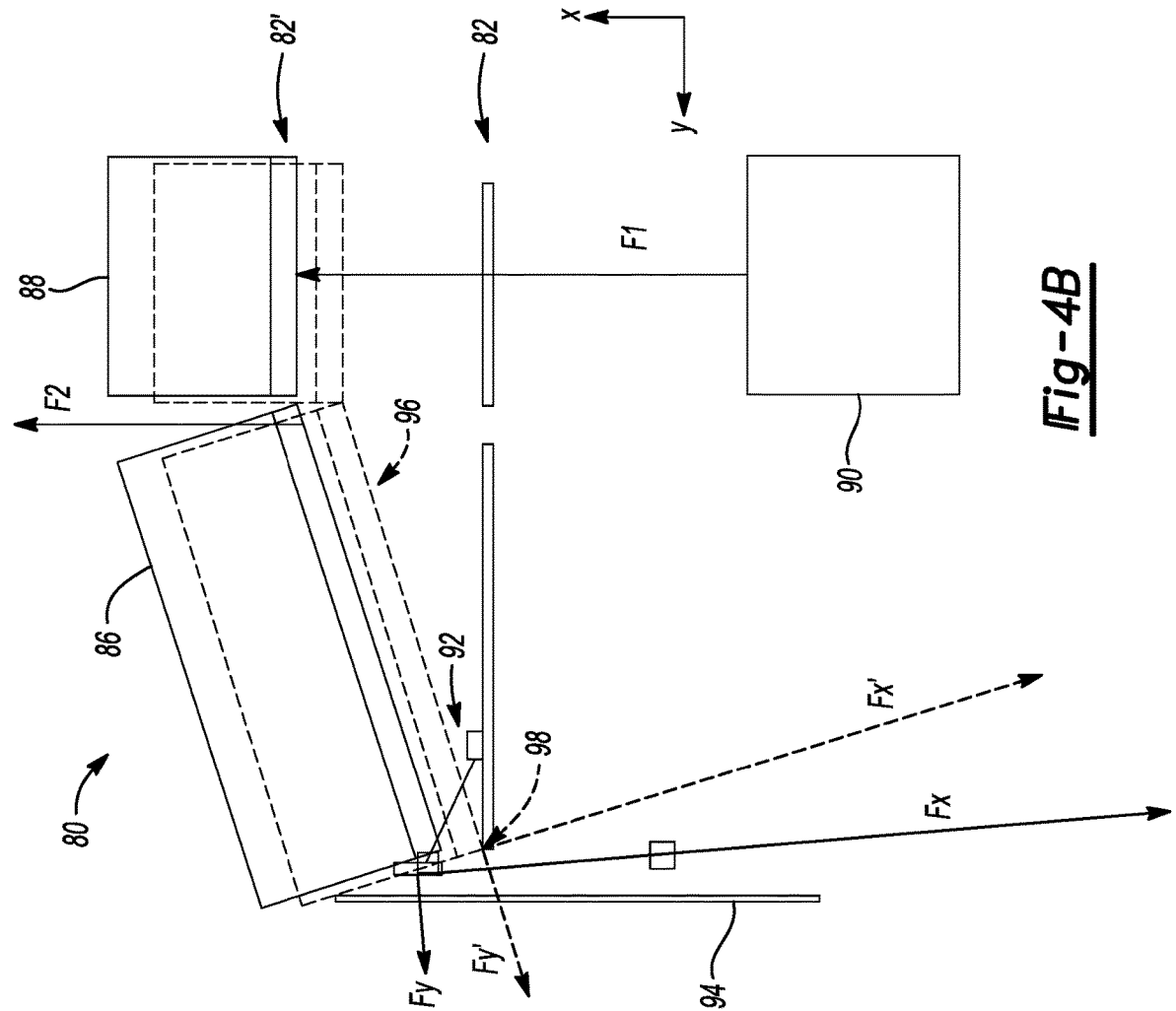
FIG. 4B shows a schematic representation of a top view of the vehicle seat back shown in FIG. 4A.
Figure 4A:
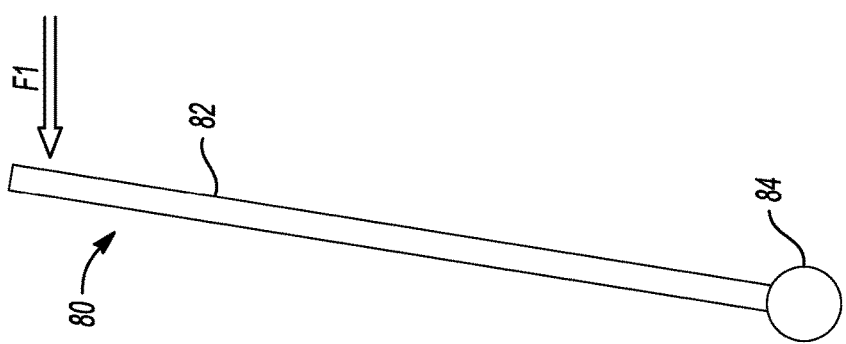
FIG. 4A shows a schematic representation of a side view of a vehicle seat back subjected to a forward loading condition.

As described above, latch systems, such as the latch systems shown in FIG. 1-3, can be specifically configured to detach and deform in the presence of some predetermined minimum amount of force. One way to choose the magnitude of force necessary to detach and deform such a latch system is to use a force level required in a standardized test. FIGS. 4A and 4B schematically illustrate a setup for one such test. FIG. 4A shows a side view of a portion of a seat 80; in particular, it shows a seat back 82 pivotably mounted at its base 84. Force (F1) as applied to the seat back 82, and although it is illustrated near a top of the seat back 82, it may be applied at some other position. As shown in FIG. 4A, the force (F1) is directed in a forward direction relative to the seat 80.

FIG. 4B shows a top view of the seat 80, which is a rear seat having a 60-40 configuration with two parts 86, 88. FIG. 4B shows a schematic representation of a test that is used in the automotive industry to simulate an impact to a seat back, such as the seat back 82. An object 90 represents a heavy container that may slide forward from a storage area of the vehicle and impact a seat back, for example, if the vehicle brakes are applied quickly. The test shown in FIG. 4B, shows a first force (F1) applied to the seat back 82, which is represented by a horizontal line showing the seat back 82 in its design position. After the impact of the object 90, the seat 80, including the seat back 82, is moved forward; the new position of the seat back 82 is shown as 82'. In addition to the force (F1) applied by the object 90, a second force (F2) is applied to the seat 80, and represents the force applied by an occupant to a seat belt. Because of the connection between the seat belt and the seat, the force (F2) is ultimately is applied to the seat 80 itself. The seat 80 includes a latch system 92, which is configured with a detachable portion and a deformable portion, similar to the latch systems shown in FIGS. 1-3. The latch system 92 includes a seat portion attached to the seat 80, and a body portion attached to the vehicle body, schematically represented by the line 94.

Shown in phantom in FIG. 4B is a second seat 96, which includes a conventional seat latch that is not configured to detach and deform like the seat latch 92. Rather, the seat latch 98 includes a rigid seat portion that is attached to the seat 96. When a force is applied to a seat from behind the seat in a forward direction, the attachment of the seat to the vehicle body creates a reaction force of equal magnitude, but in the opposite direction—i.e., rearward. Using the frame of reference shown in FIG. 4B: where the x-axis is oriented in the fore-aft direction, and the y-axis is oriented in the transverse direction, the forces (F1) and (F2) are directed in the positive x-direction and the corresponding reaction force is directed in the negative x-direction.

In the test schematically illustrated in FIG. 4B, the force (F1) may be set at 1000 Newtons (N), and the force (F2) may be set at 700 N. In this case, the reaction force would be 1700 N in the negative x-direction. Seat latches, such as the ones illustrated and described above—i.e., having a latch hook or pawl attached to a striker bar—tend to be very strong and capable of resisting high forces in the x-direction, but relatively weak when subjected to forces in the y-direction. In this context, the strength or weakness of the seat latch refers to its ability to maintain engagement, not whether the components break or otherwise fail. Thus, forces applied to a seat latch in the x-direction do little to disengage the latch; whereas relatively moderate forces applied in the y-direction may cause the latch to disengage. Because it is desirable to maintain engagement of the seat latch during an impact such as the one simulated by the test illustrated in FIG. 4B, it is desirable to configure the seat latch to experience a minimum of forces in the y-direction.

FIG. 4B shows the reaction force experienced by the latches 92, 98, which as previously noted is the sum of the forces (F1) and (F2). As illustrated in FIG. 4B, however, the reaction forces are broken down into their x-components and their y-components, where the x-axis and the y-axis have been appropriately rotated to match the orientation of the seats 80, 96 in their new positions after the forces (F1) and (F2) have been applied. As shown in FIG. 4B, the x-component of the reaction force (Fx) is very large compared to the y-component of the reaction force (Fy). This is because the latch system 92 has detachable and deformable features such as illustrated and described in conjunction with FIGS. 1-3.

Because the latch system 92 deforms, the latch hook and striker bar are much more likely to remain engaged after impact. Conversely, the y-component of the reaction force (Fy') associated with the conventional latch system 98 is much larger than the y-component (Fy) associated with the detachable and deformable latch system 92. And although the x-component (Fx') of the reaction force associated with the conventional latch system 98 is smaller than the x-component (Fx) associated with the detachable and deformable latch system 92, this is of little or no benefit, because forces in the x-direction do not tend to disengage the latch. Using actual test data, a reaction force of 1700 N is resolved into x- and y-components for the conventional latch 96 as: Fx'≈1622 N and Fy'≈510 N. In contrast, the reaction force of 1700 N is resolved into x- and y-components for the detachable and deformable latch as: Fx≈1694 N and Fy≈134 N. In this example, the latch system 92 results in a reduction in the y-component force of over 70%.

Figure 5:
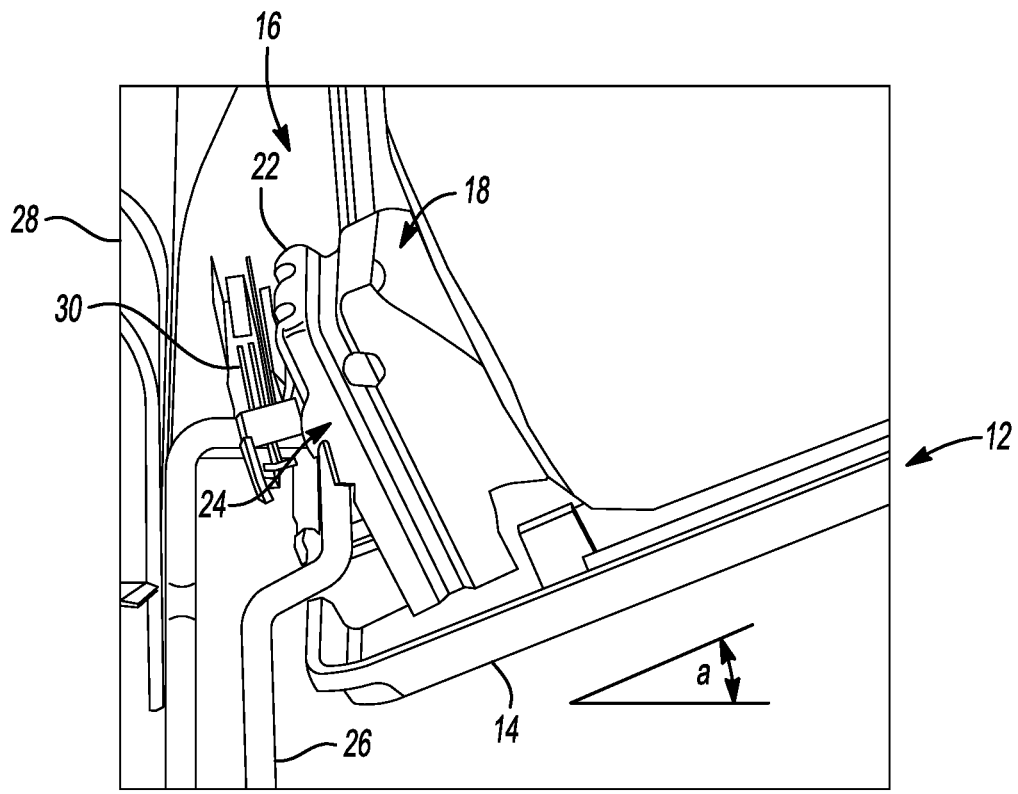
FIG. 5 shows the latch system from FIG. 1 subjected to a forward loading condition in the early stages of deformation.
Figure 6:
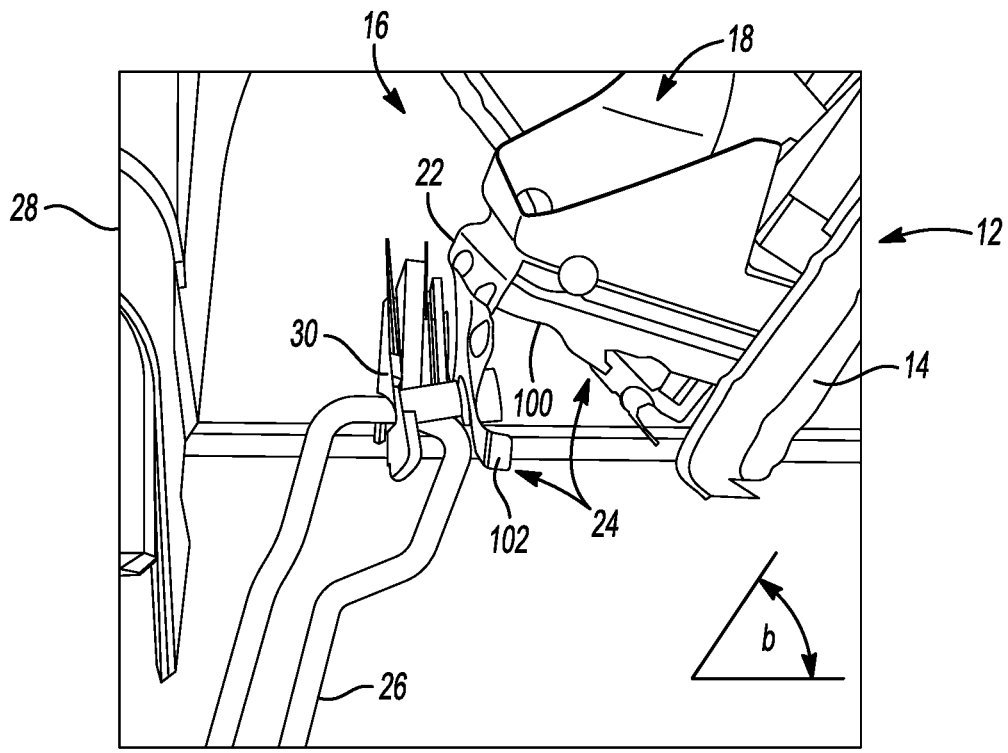
FIG. 6 shows the latch system from FIG. 5 in the later stages of deformation.

FIG. 5 shows the latch system 16 from FIG. 1 approximately 50 milliseconds (ms) after a load has been applied to the seat 12 in a forward direction relative to the seat 12—see, for example, the force (F1) shown in FIG. 4B. At this early stage of the impact process, the detachable portion 24 has not yet detached and the deformable portion 22 has not yet deformed. The seat 12 has rotated from its design position counterclockwise as viewed from the top by an angle (a). FIG. 6 shows the same seat 12 and latch system 16, but in this illustration, it is 70 ms after the impact force has been applied. The detachable portion 24 has completely detached, and seat has rotated much farther, as shown by the angle (b). The deformable portion 22 is deforming as a first portion 100 of the seat portion 18 rotates relative to a second portion 102 of the seat portion 18. Because of the detaching and deforming process undergone by the latch system 16, the pawl 30 remains engaged with the striker bar 26 so that attachment between the seat 12 and the vehicle body 28 is maintained.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle having a seat and a vehicle body, comprising:
    a latch system having a seat portion configured for attachment to the seat and selectively engageable to and disengageable from the vehicle body, the seat portion including a deformable portion and a detachable portion, the deformable portion being configured to deform when the seat portion is engaged with the vehicle body and the seat is subjected to a force of at least a predetermined magnitude tending to pull the seat away from the vehicle body in a forward direction, and the detachable portion including a plurality of elements configured such that at least one of the elements separates from at least one other of the elements when the seat portion is engaged with the vehicle body and the seat is subjected to the force.

2. The seating system of claim 1, wherein the seat portion further includes a first portion and a second portion, and the deformable portion includes a pivotable attachment between the first portion and the second portion.

3. The seating system of claim 2, wherein the pivotable attachment is positioned at respective proximal ends of the first and second portions, and the detachable portion is positioned at respective distal ends of the first and second portions.

4. The seating system of claim 3, wherein the respective distal ends of the first and second portions are configured to separate from each other such that the first and second portions pivot relative to each other at the pivotable attachment when the seat portion is engaged with the vehicle body and the seat is subjected to the force.

5. The seating system of claim 1, wherein the seat portion further includes a first portion and a second portion, and the deformable portion includes a pivotable attachment defining a pivot line between the first portion and the second portion.

6. The seating system of claim 5, wherein the pivotable attachment includes at least one discontinuity configured to control deformation of the deformable portion when the seat portion is engaged with the vehicle body and the seat is subjected to the force.

7. The seating system of claim 1, wherein the latch system further includes a body portion having a striker bar attached to the vehicle body, and the seat portion further includes a pawl configured to receive the striker bar therein.

8. A seating system for a vehicle having a seat and a vehicle body, comprising:
   a latch system having a seat portion including a first portion configured for attachment to the seat and a second portion connected to the first portion and selectively engageable to and disengageable from the vehicle body, the seat portion being deformable such that the first portion and the second portion separate relative to each other when the second portion is engaged with the vehicle body and the seat is subjected to a force of at least a predetermined magnitude tending to disengage the seat portion from the vehicle body in a forward direction.

9. The seating system of claim 8, wherein the first and second portions have respective proximal and distal ends, and the second portion is connected to the first portion with a pivotable attachment at the proximal ends.

10. The seating system of claim 9, wherein the second portion is detachably connected to the first portion at the distal ends, and the distal ends are configured to separate such that the first and second portions pivot relative to each other at the pivotable attachment when the second portion is engaged with the vehicle body and the seat is subjected to the force.

11. The seating system of claim 8, wherein the seat portion is deformable at a pivotable attachment between the first portion and the second portion.

12. The seating system of claim 11, wherein the pivotable attachment defines a pivot line between the first and second portions.

13. The seating system of claim 12, wherein the pivotable attachment includes at least one discontinuity configured to control deformation of the seat portion when the second portion is engaged with the vehicle body and the seat is subjected to the force.

14. The seating system of claim 8, wherein the latch system further includes a body portion having a striker bar attached to the vehicle body, and the seat portion further includes a pawl configured to receive the striker bar therein.

15. A seating system for a vehicle having a seat and a vehicle body, comprising:
   a latch system having a seat portion configured for attachment to the seat and selectively engageable to and disengageable from the vehicle body, the seat portion including a first portion and a second portion pivotably attached to the first portion at respective proximal ends and detachably connected to the first portion at respective distal ends such that the first and second portions detach at the distal ends and pivot relative to each other at the proximal ends when the seat portion is engaged with the vehicle body and the seat is subjected to a force of at least a predetermined magnitude directed in a forward direction relative to the seat.

16. The seating system of claim 15, wherein the first portion is pivotably attached to the second portion to form a pivot line.

17. The seating system of claim 16, wherein the distal ends of the first and second portions form a detachable portion of the seat portion, and the proximal ends of the first and second portions form a deformable portion of the seat portion, the detachable portion being configured to separate and the deformable portion being configured to deform when the seat portion is engaged with the vehicle body and the seat is subjected to the force.

18. The seating system of claim 17, wherein the deformable portion includes at least one discontinuity configured to control deformation when the seat portion is engaged with the vehicle body and the seat is subjected to the force.

19. The seating system of claim 18, wherein the at least one discontinuity includes a swaged portion.

20. The seating system of claim 18, wherein the at least one discontinuity includes a hole.

* * * * *